US012483462B2

(12) United States Patent
Luo et al.

(10) Patent No.: US 12,483,462 B2
(45) Date of Patent: Nov. 25, 2025

(54) CLOUD NETWORK FAILURE AUTO-CORRELATOR

(71) Applicant: Google LLC, Mountain View, CA (US)

(72) Inventors: Tianqiong Luo, Santa Clara, CA (US); Hui Liu, San Ramon, CA (US); Hongkun Yang, San Jose, CA (US); Gargi Adhav, San Jose, CA (US); Anantanarayanan Govindarajan Iyengar, Saratoga, CA (US); Yihan Zhang, Evanston, IL (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/989,998

(22) Filed: Nov. 18, 2022

(65) Prior Publication Data

US 2023/0164022 A1     May 25, 2023

Related U.S. Application Data

(60) Provisional application No. 63/281,990, filed on Nov. 22, 2021.

(51) Int. Cl.
*H04L 41/0631* (2022.01)
*H04L 41/16* (2022.01)

(52) U.S. Cl.
CPC .......... *H04L 41/0645* (2013.01); *H04L 41/16* (2013.01)

(58) Field of Classification Search
CPC .................... H04L 41/0645; H04L 41/16
See application file for complete search history.

(56) References Cited

U.S. PATENT DOCUMENTS

| | | | |
|---|---|---|---|
| 10,855,536 B1 | 12/2020 | Blackburn et al. | |
| 2004/0187048 A1* | 9/2004 | Angamuthu | ........ H04L 41/0645 |
| | | | 714/E11.026 |
| 2009/0222697 A1* | 9/2009 | Thakkar | .............. G06F 11/3676 |
| | | | 714/38.1 |
| 2017/0019315 A1* | 1/2017 | Tapia | ................... H04L 41/0631 |
| 2017/0034010 A1* | 2/2017 | Fong | ....................... H04L 67/10 |
| 2017/0372212 A1* | 12/2017 | Zasadzinski | .......... G06F 11/079 |
| 2018/0248905 A1 | 8/2018 | Côté et al. | |
| 2019/0306023 A1 | 10/2019 | Vasseur et al. | |
| 2020/0110761 A1* | 4/2020 | Cooper | .................... G06F 16/28 |
| 2020/0379875 A1* | 12/2020 | Krishnaswamy | ... G06F 11/0784 |
| 2021/0152416 A1* | 5/2021 | A | ......................... H04L 41/0631 |
| 2021/0350253 A1* | 11/2021 | Wang | ..................... G06N 3/044 |
| 2022/0004546 A1* | 1/2022 | Rogers | .................. G06F 16/245 |

FOREIGN PATENT DOCUMENTS

LU          101632 B1    8/2021

OTHER PUBLICATIONS

Extended European Search Report for European Patent Application No. 22208840.3 dated Mar. 22, 2023. 8 pages.

\* cited by examiner

*Primary Examiner* — Dhairya A Patel
*Assistant Examiner* — Eui H Kim
(74) *Attorney, Agent, or Firm* — Lerner David LLP

(57) ABSTRACT

Analysis of a root cause of errors within a cloud network is manually complex and computationally intensive. Methods and systems are provided to determine a subset of elements of the cloud network to analyze, and to identify a subset of analyzers for analyzing the subset of elements to determine the root cause for the error. Thus, when configuring a network, a user may be provided with an identification of the root cause of error, enabling the user to quickly identify and correct the error.

15 Claims, 5 Drawing Sheets

CLOUD NETWORK FAILURE AUTO-CORRELATOR

CROSS-REFERENCES TO RELATED APPLICATIONS

The present application claims the benefit of the filing date of U.S. Provisional Application No. 63/281,990, filed on Nov. 22, 2021, the disclosure of which is hereby incorporated herein by reference.

BACKGROUND

Modern cloud environments can contain a very large number of virtual machines (VMs) or virtual private cloud (VPC) networks. A virtual private cloud (VPC) network can be conceptualized as a physical network which is virtualized within a cloud environment. Cloud systems or cloud environments are maintained by a cloud operator or owner. Often, a portion of the cloud environment or the virtual machines belong to different users or user groups. Each virtual machine on the cloud environment can deploy various applications specific to the user or user group to which it belongs. The physical structure on which the cloud environment is executed, which is typically owned by the owner of the cloud provider, may include tens or hundreds of data centers which may be distributed across the globe.

Many network outages and performance issues within a cloud or network are the result of misconfiguration of the network. Troubleshooting misconfigurations is manually intensive for end users or network administrators, particularly when changing the configuration file.

In addition, a brute force or near brute force approach to analysis of every change and every aspect of the network, including the combinatorial effects of aggregating multiple potential changes from a configuration file, is computationally impossible or otherwise infeasible.

In this complex, highly linked, and dynamic environment, validating and determining the impact of configuration changes, whether at the level of the cloud, VPC, VM, group, or application, is difficult. Specifically, upon a number of changes occurring, a user of the cloud system may want to determine the root cause of a network failure or error.

SUMMARY

Aspects of the present disclosure include methods, systems, and apparatuses for auto-correlation of cloud network failures.

Aspects of the disclosed technology include a method of evaluating a root cause of a cloud network failure. The method can comprise receiving one or more triggers for analysis, the one or more triggers corresponding to a failure within the cloud network; comparing the one or more triggers against a set of configuration changes to generate a subset of configuration changes; determining the scope of analysis within the cloud network based on subset of configuration changes and the one or more triggers; selecting a set of analyzers from an analyzer module based on at least the scope of the analysis; performing an analysis of the determined scope of the cloud network using the selected set of analyzers; and determining the root cause of the one or more triggers based on the analysis. The scope of analysis can be done based on a software module trained using a machine learning model. A machine learning model can be trained using a set of expert rules. The scope of analysis can be determined based on a software module trained using expert rules. A selection of the set of analyzers is based on a trained machine learning model. A scheduler can initiate the evaluation of the root cause at predetermined intervals. The scope of analysis can be based on a set of network resources which are related to a set of network resources directly affected by the cloud network failure. The correlator can build knowledge based dependency graphs. Knowledge based dependency graphs can be used to find related resources.

Aspects of the disclosed technology include a system comprising a processor coupled to a non-transitory memory, the non-transitory memory comprising instructions which when executed by the processors perform the steps of: receiving one or more triggers for analysis, the one or more triggers corresponding to a failure within the cloud network; comparing the one or more triggers against a set of configuration changes to generate a subset of configuration changes; determining the scope of analysis within the cloud network based on subset of configuration changes and the one or more triggers; selecting a set of analyzers from an analyzer module based on at least the scope of the analysis; performing an analysis of the determined scope of the cloud network using the selected set of analyzers; and determining the root cause of the one or more triggers based on the analysis.

A scheduler module can be configured to receive the one or more triggers for analysis. The scheduler queue can contain a list of triggers or events. The list of triggers or events can be used in scheduling analysis of the cloud network. Analyzers within the analyzer module can have a plurality of hierarchies. The plurality of hierarchies can correspond to logical levels within the cloud network. The system can further comprise a model module, the model module comprising a plurality of models, wherein each model of the plurality of models can be configured to select a scope of the cloud network or resources within the cloud network for analysis. One or more models can be selected based on the one or more triggers.

Aspects of the disclosed technology can include a non-transient computer readable medium containing program instructions, the instructions when executed perform the steps of: receiving one or more triggers for analysis, the one or more triggers corresponding to a failure within the cloud network; comparing the one or more triggers against a set of configuration changes to generate a subset of configuration changes; determining the scope of analysis within the cloud network based on subset of configuration changes and the one or more triggers; selecting a set of analyzers from an analyzer module based on at least the scope of the analysis; performing an analysis of the determined scope of the cloud network using the selected set of analyzers; and determining the root cause of the one or more triggers. The scope of analysis can be done based on a software module trained using a machine learning model. A machine learning model can be trained using a set of expert rules.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Overview

Figure 1A:
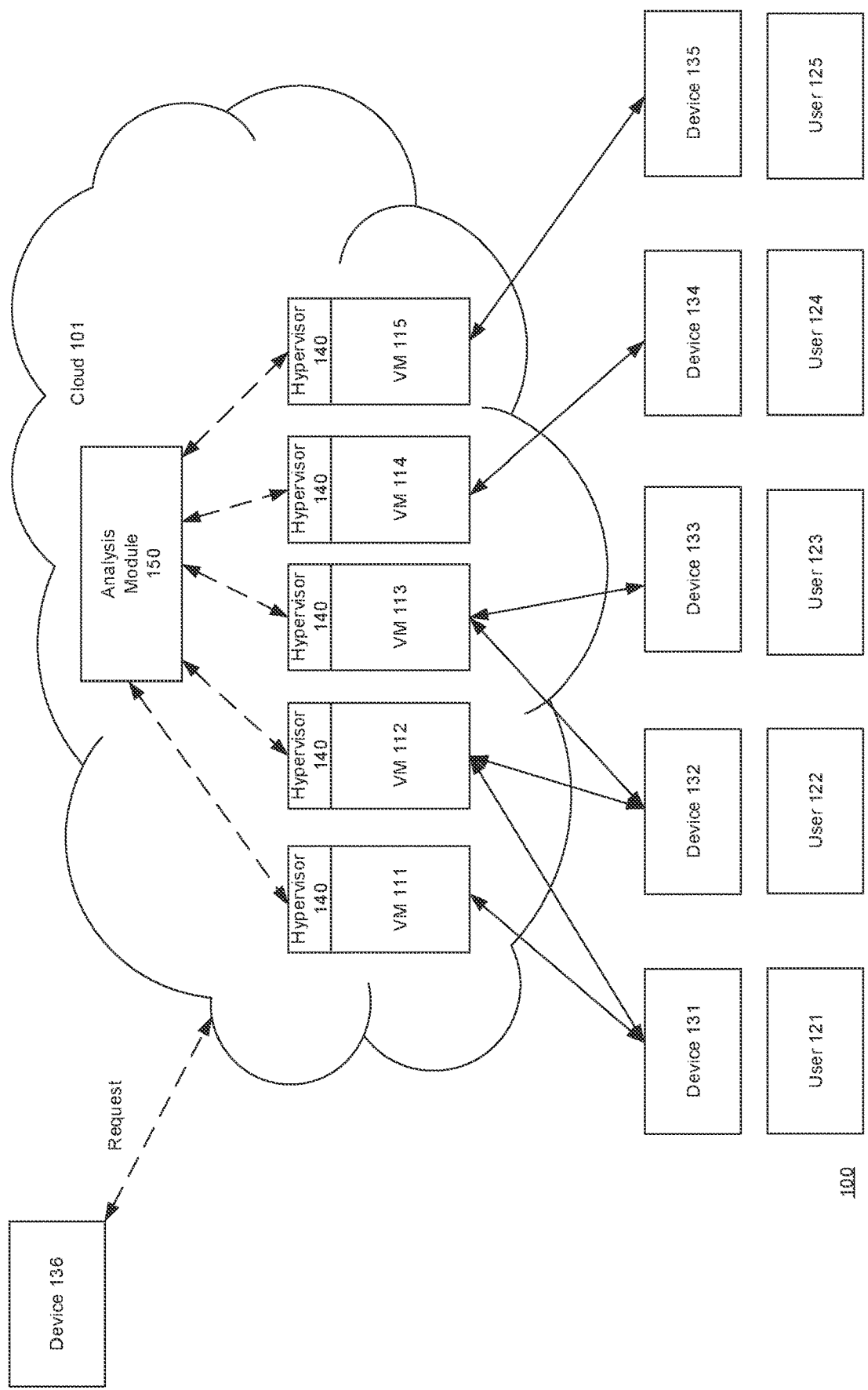
FIG. 1A illustrates a schematic view of a network 100.

Aspects of the present disclosure include methods, systems, and apparatuses for auto-correlation of cloud network failures. For example, the present disclosure can be used to determine, between two configurations or time periods, what change or set of changes could have caused a specific issue in the network. The disclosed technology allows for correlation of configuration changes to network failures and vice versa.

Aspects of the present disclosure allow for evaluation of a portion of a cloud network for analysis based on a type of error or trigger that is created. Subsequent to determining the portion of the cloud network which is to be analyzed, a subset of analyzers related to the type of error or trigger is determined for analysis. In some examples, the portion of the cloud network for analysis is performed after determining the subset of analyzers to utilize in the analysis.

Aspects of the disclosed technology allow for a cloud or network auto-correlator for failure and creating knowledge based dependency graphs to find "true" root-causes of network failures. As one illustrative example, a dynamic route in a network may be shadowed by another route. There are multiple possible root causes for such a failure: for instance, it is possible that it is shadowed by a subnet route and the true root cause is a new subnet created in the region; it is possible that a peer was added causing some routes to be imported; and it is possible that a new subnet was created in the peered network. As can be seen from this, different resources within the network are related and determination of the root configuration changes related to the network failure can be done. Root cause analysis (RCA) can be the process of discovering the root causes of problems, such as in the context of networks, a set of configuration changes leading to one or more problems.

Aspects of the disclosed technology allow for the use of a knowledge-based dependency graph built based on expert rules contributed by developers or users, which can evolve over time according to users' feedback.

Aspects of the disclosed technology allows for machine learning methods and techniques to create, modify, or refine software modules described in more detail below which can be used to analyze the network, such as analyzers, and determine the scope of the network to be analyzed responsive to an error, error event, or trigger (e.g. slowdown, congestion, or high latency in the network).

As will be appreciated by a person of skill in the art, limiting the analysis to a subset of the network, which can be based on the type of trigger, and/or analyzer to be used, can efficiently calculate the root cause for any trigger or error condition in the network caused by a change in the cloud environment.

As used in this disclosure, a cloud user, cloud consumer, or cloud customer can refer to an individual, organization, or other entity which can purchase, rent, subscribe to, or otherwise utilize cloud resources. A cloud provider can refer to an organization, company, or entity which provides cloud based services to customers, users, or consumers.

Example Systems and Methods

FIG. 1 illustrates a schematic view of an example of a network 100 with cloud 101, virtual machines 111-115, devices 131-135 respectively associated with users 121-125. Cloud 101 can contain hardware which can include, for example, networking equipment, like switches, routers, firewalls, load balancers, storage arrays, backup devices, and servers. Cloud 101 connects the servers together, dividing and abstracting resources to make them accessible to users. Cloud 101 can contain an analysis module 150, a hypervisor 140, and virtual machines 111-115.

Although cloud 101 is represented as a singular entity, a person of skill in the art should understand that cloud 101 may include distributed hardware and software systems. Cloud 101 can include of other clouds. In other examples, cloud 101 can be a virtual machine or a virtual cloud which is itself located within another cloud. In some examples, cloud 101 can be distributed or divided across a plurality of physical locations, such as datacenters, which can be interlinked or interconnected. In other examples, portions of cloud 101 can be hosted offsite. For instance, in some examples, computer processing or computational hardware for cloud 101 can be located in one location while storage mediums can be located in other areas. Examples of computational and storage mediums are disclosed herein with reference to FIG. 3.

Cloud 101 can also be configured such that aspects of the cloud environment are controlled. For example, cloud 101 can contain software which responds to user demands or requests, such as increasing or decreasing the size of a virtual machine, the amount of resources dedicated to a virtual machine, or the number of virtual machines available to a given user.

Cloud 101 can contain a number of virtual machines 111-115. Generally, a virtual machine is an emulation of a computer system or computer network. Virtual machines are based on computer architectures and can provide the functionality of a physical computer. An implementation may involve specialized hardware, software, or a combination. Each virtual machine 111-119 can be hosted or run on a cloud. In some examples, a virtual machine can be instantiated responsive to a user request. In some examples, each virtual machine can be a cluster of virtual machines.

Cloud 101 can also contain a hypervisor 140. A hypervisor is also known as a virtual machine monitor, a VMM, or a virtualizer. A hypervisor is a piece of computer software, firmware, or hardware that can create, run, or monitor virtual machines. In some examples, only certain types of information about the virtual machines in cloud 101 can be accessible to hypervisor 140.

Each virtual machine can be managed by a user 121-125. Each user can access his or her corresponding virtual machine through tools provided by the cloud provider, such as through user devices 131-135. In some examples, this occurs through the use of a web interface, such as web-interface 141, which is typically provided by the cloud provider. In other examples, specialized software installed on a user device can be used to interact with the cloud or a particular virtual machine. User devices 131-135 can be similar to computing system 310, described below with reference to FIG. 3.

User device 136 can be a device which is not controlling or subscribed to the virtual machines of cloud 101, but can access information or resources of the clouds. In some examples, a user device 136 can make a request or attempt to access resources which are hosted on cloud 101. For example, user device 136 may attempt to make a particular request using a web interface which can in turn be routed to a particular virtual machine on cloud 101.

Each virtual machine, or cluster of virtual machines, can run applications, software, or operating systems, and can store data. In addition, requests from users to the cloud, to one or more virtual machines, or between virtual machines can generate network data or traffic.

Cloud 101, or any part thereof, can be configured with one or more configuration parameters. In some examples, configuration parameters can be provided via configuration files. As one example, this can occur when a customer or user creates a new firewall rule configuration either via UI or command line tool, the new firewall rule is deployed to VM 111-115, and the analysis module 150 also receives the firewall rule creation.

At times, upon a configuration change being made, one or more errors can emerge within cloud 101. Understanding the correlation between an error and a configuration change can be made using the disclosed technology as discussed herein and further explained below with reference to FIG. 1B.

Figure 1B:
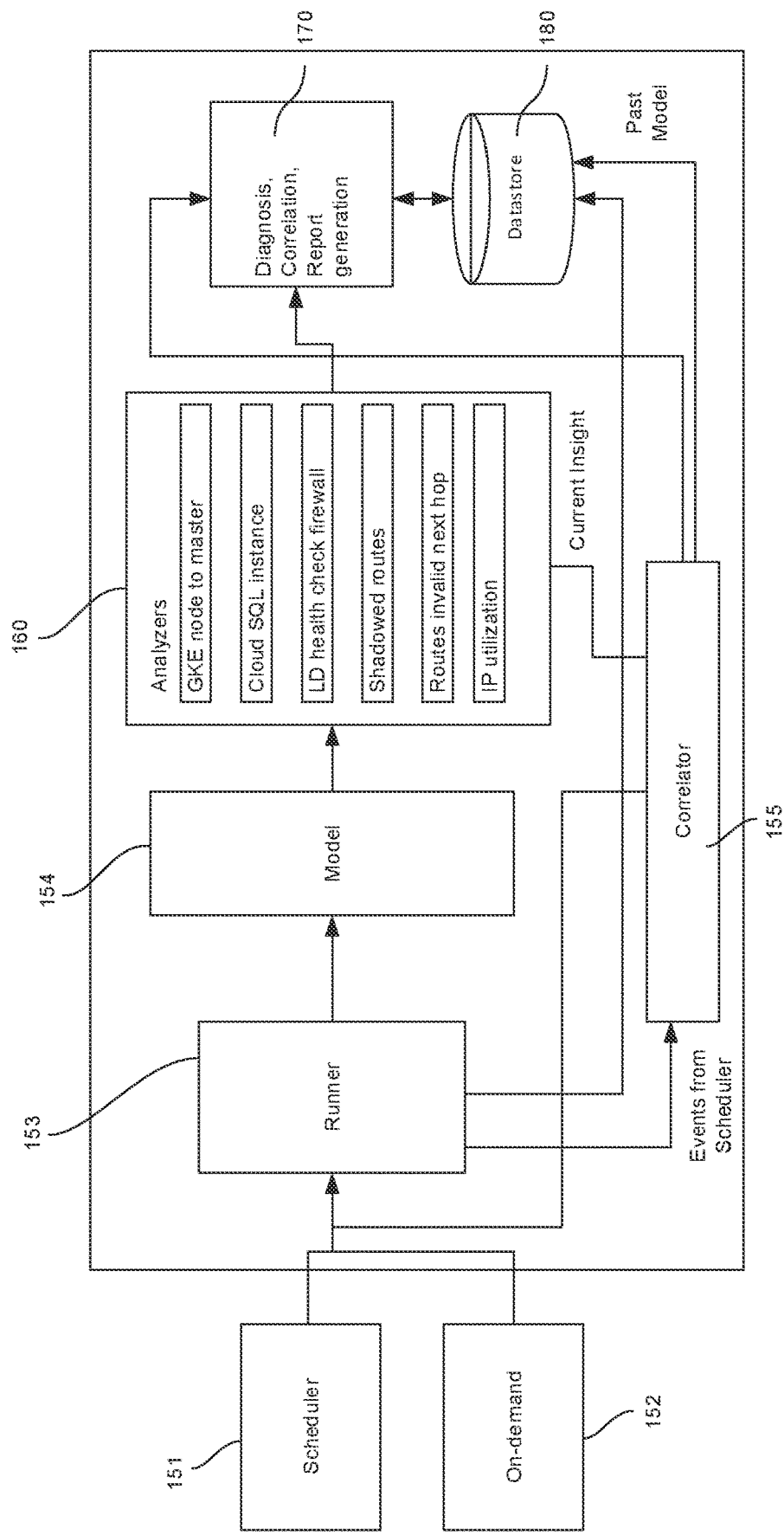
FIG. 1B illustrates a schematic view of an analysis module.

FIG. 1B illustrates aspects of analysis module 150. In broad overview, analysis module 150 can analyze one or more events or errors within cloud 101 to determine a "root cause" of the events or errors. Example methods related to analysis module 150 are further described below.

Analysis module 150 can be composed of a plurality of software modules, such as for example scheduler 151, on-demand module 152, runner module 153, model module 154, correlator module 155, analyzer module 160, diagnosis correlation report generation module 170, and datastore 180.

In broad overview, and as further explained with respect to examples provided herein, analysis module 150 can be used to determine the "root cause" of an error or event. Analysis module can 150 can receive a trigger via scheduler 151 or on-demand module 152, from cloud 101, or from a user input, and determine a root cause responsive to the trigger.

Scheduler 151 can push a triggered event to a scheduler queue. The event can be analyzed from the scheduler queue. In some examples, schedule 151 can also ensure that analysis module 150 does not analyze changes too often even upon receiving a trigger or indication to run an analysis. Scheduler 151 can be tuned to balance requirements of immediate analysis versus efficiency. In some examples, the scheduler can perform analysis periodically by accumulating events in batches and trigger analyzers corresponding to the batched events. On-demand module 152 can cause analysis to be performed based on certain events or conditions being met. Runner module 153 can run various models.

Correlator module 155 can create or build knowledge based dependency graphs to find related resources within the cloud. A dependency graph can be grouped as a library for each analyzer within analyzer module 160. Each analyzer can have an expert who can define the related resources based on expert rules or knowledge. In other examples, the related resources for an analyzer can be determined based on machine learning techniques.

An example mapping of various analyzers which can be contained within analyzers module 160 and related resources are provided below

| Analyzer | Resources |
|---|---|
| unused_ip | Address, instance, forwarding rule, router |
| route_next_hop | Route, instance, vpn tunnel, forwarding rule |
| lb_health_check | Firewall, forwarding rule, health check, instance, neg |
| ke_connectivity | Instance, cluster, firewall, route |

As an additional example, an "unused ip" analyzer can add a "users" field as a related resource. The shadowed dynamic route analyzer can add peers importing routes as related resources. The correlator then tries to find these related resources in events of the scheduler queue OR model diff. Rules contained within analyzers module 160 can adapt or evolve over time according to users' feedback. In some examples, the extent of evolution can be based on predetermined parameters or be based on a machine learning model.

Model module 154 can contain a plurality of models which can be used to determine which analyzers from analyzers module 160 to run. In some examples, the models can be based on a set of expert rules.

Analyzers module 160 can contain one or more tools, software modules, scripts, tests, or other analysis tools to analyze one or more aspects of a cloud environment. Non-limiting examples of analyzers which can be included in analyzer 160 include checking for shadowed routes, examining routes which are invalid to a next hop, or checking or more aspects of IP utilization.

In some examples, the above modules can contain or be generated using machine learning models. As one non-limiting example, analyzers 160 can contain tests which are generated using a machine learning model on a training set.

In some examples, one or more of the following techniques can be used as part of machine learning. Probabilistic methods can be used. For example, a gaussian mixture model can be used. Gaussian mixture models are a probabilistic model for representing normally distributed sub-populations within an overall population. In a Gaussian mixture model, it is not required that an observed set of data should characterize or state which subpopulation a particular observation within the distribution belongs to. Example machine learning techniques which can be used include the following. In some examples, a mix of supervised learning techniques and unsupervised learning techniques can be used. In some examples, generative adversarial networks can be used to predict or detect network defects. Generative adversarial networks use two networks, one adversarial and one generative, in an attempt to fool the adversarial network by objects generated by the generative network. In some examples, clustering methods can be used to cluster inputs, network parameters, trained models, or virtual machines. Clustering methods can be used in real time to classify and match models or groups of models with virtual machines or groups of virtual machines. Clustering can be an unsupervised machine learning technique in which the algorithm can define the output. One example clustering method is "K_Means" where K represents the number of clusters that the user can choose to create. Various techniques exist for choosing the value of K, such as for example, the elbow method. Some other examples of techniques include dimensionality reduction. Dimensionality reduction can be used to remove the amount of information which is least impactful or statistically least significant. In networks, where a large amount of data is generated, and many types of data can be observed, dimensionality reduction can be used in conjunction with any of the techniques described herein. One example dimensionality reduction method is principle component analysis (PCA). PCA can be used to reduce the dimensions or number of variables of a "space" by finding new vectors which can maximize the linear variation of the data. PCA allows the amount of information lost to also be observed and for adjustments in the new vectors chosen to be made. Another example technique is t-Stochastic Neighbor Embedding (t-SNE). Ensemble methods can be used, which primarily use the idea of combining several predictive models, which can be supervised ML or unsupervised ML to get higher quality predictions than each of the models could provide on their own. As one example, random forest algorithms Neural networks and deep learning techniques can also be used for the techniques described above. Neural networks generally attempt to replicate the behavior of biological brains in turning connections between an input and output "on" or "off" in an attempt to maximize a chosen objective.

Figure 2:
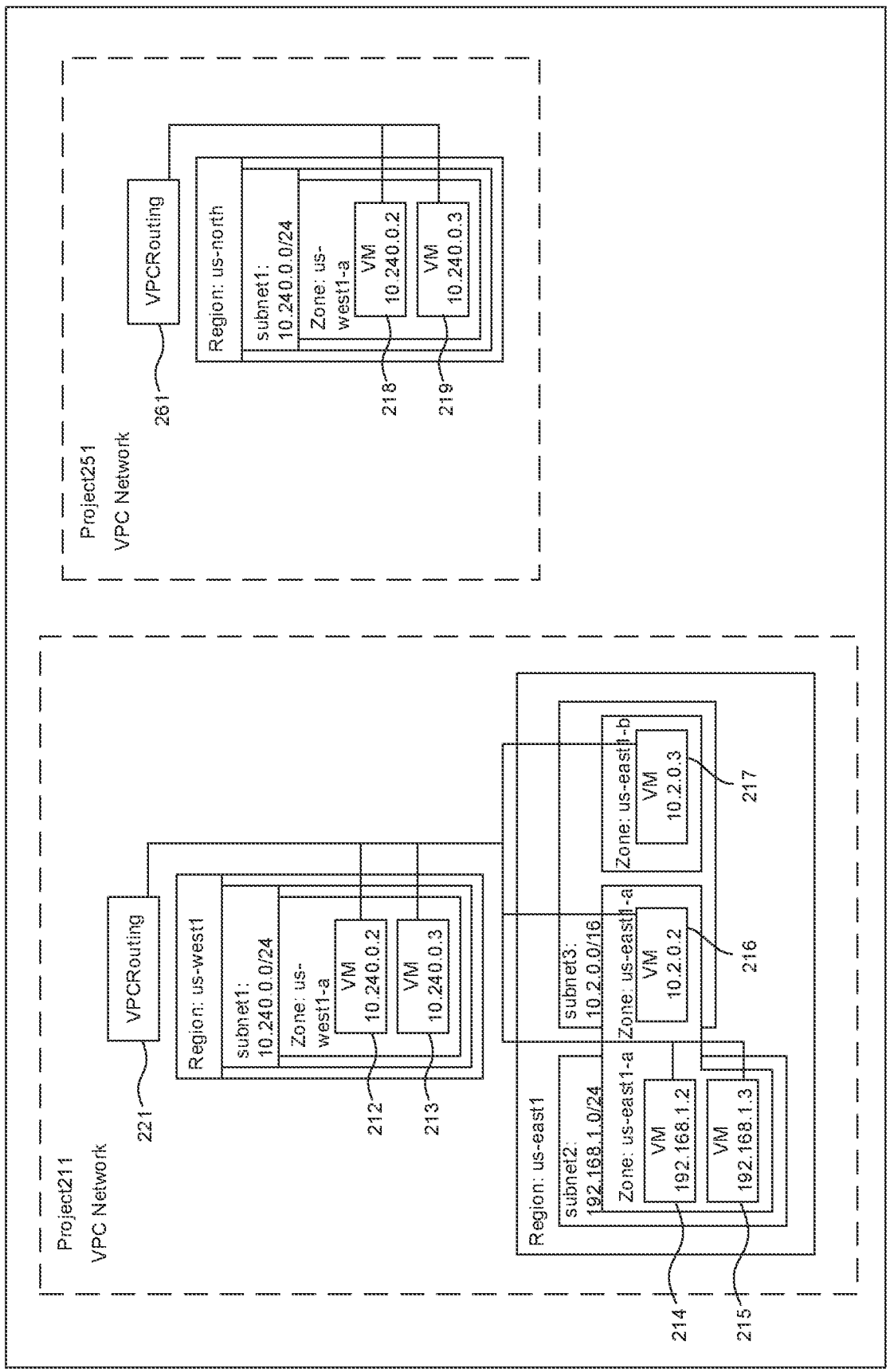
FIG. 2 illustrates an additional schematic and logical view of a network.

FIG. 2 illustrates example cloud 200 in which the cloud is broken into VPC networks and other logical groups. The VPC network(s) can be executed or run on, for example, computing system 310 described below with respect to FIG. 3.

Illustrated in FIG. 2 are groups 211 and 251 existing on a cloud 200. The cloud 200 can be hosted on a combination of virtual or physical machines by a cloud provider. Each project can be run on a software-defined networking (SDN) stack, which can be a software layer within the "layers" on which the VPC network is run or established. SDN is an approach to network management that enables dynamic and programmatically efficient network configurations in order to improve network performance and monitoring, and thus enabling it to provide efficiencies in cloud computing environments.

Groups 211 and 251 can contain or be made of a VPC network, which are separated from one another. Groups 211 and 251, or VPC networks, can be hosted or run on a distributed computing system, such as for example, Kubernetes. In some examples, such as those illustrated in FIG. 2, the project can be a VPC network. Project 211 and 251 contain VPC routing modules 221 and 261 respectively. VPC routing modules 221 and 261 can direct traffic external to one or more endpoints within projects 211 and 251, such as for example, virtual machines, virtualized containers, or virtualized computing nodes. VPC routing modules 221 and 261 can also connect various endpoints within each project. Each project can be broken down into smaller logical units or divisions, such as regions, subnets, or zones. In some examples, each logical node hosted within each VPC network can be one or more virtual machines, such as virtual machines (VMs) 212-219. Each virtual machine can be running as part of a distributed computing system.

Elements of cloud 200 can be broken into various logical levels, such as regions, subnets, zones, and VMs. Although the levels provided with respect to FIG. 2 are example logical divisions or levels, a cloud network can be arbitrarily structured.

Figure 3:
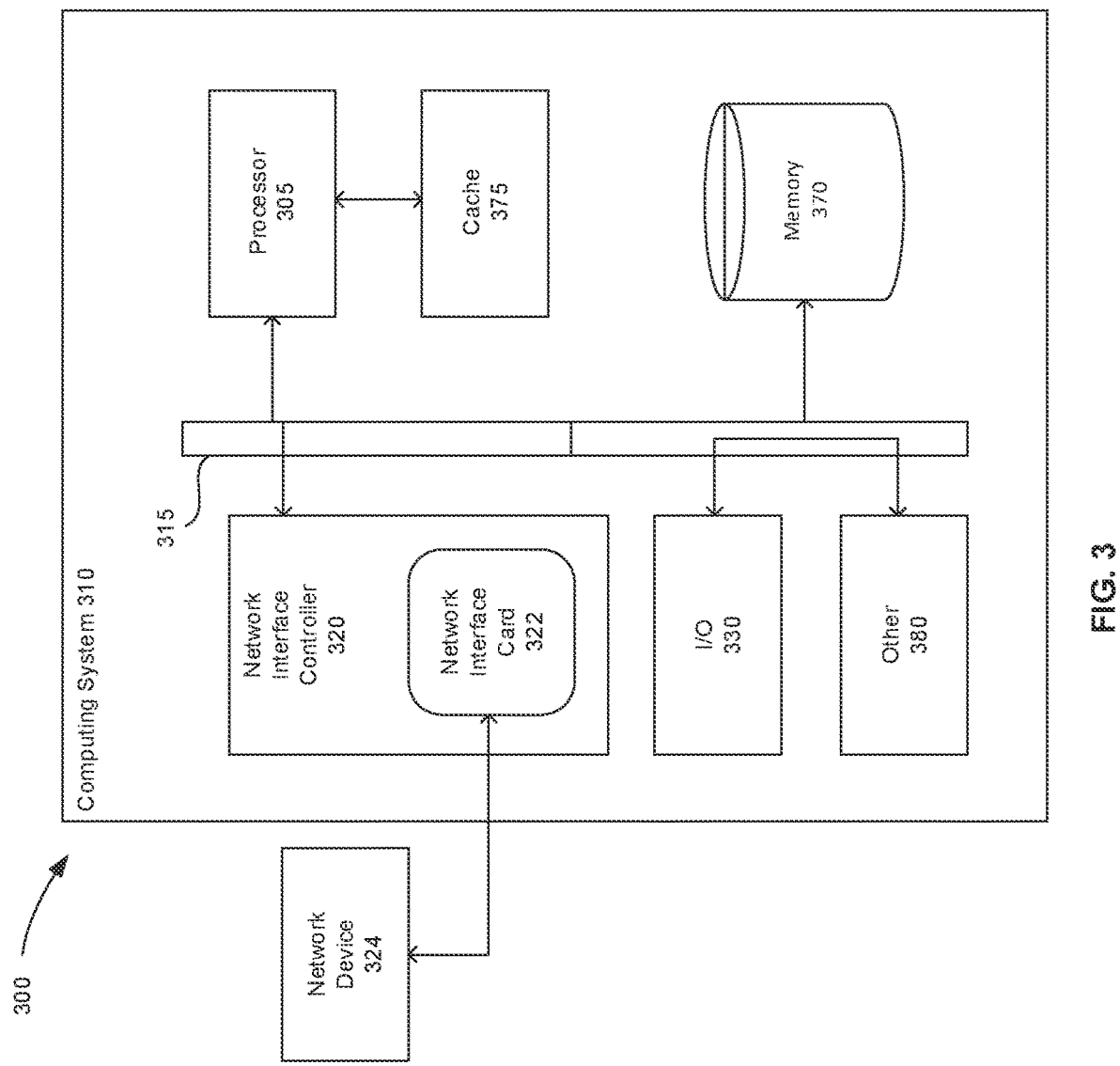
FIG. 3 illustrates aspects of an example computing system.

FIG. 3 is a block diagram 300 illustrating an example computer system 310 with which aspects of this disclosure, including cloud 101 and analysis module 150 can be implemented. In certain aspects, the computer system 310 may be implemented using hardware or a combination of software and hardware, either in a dedicated server, or integrated into another entity, or distributed across multiple entities. In some examples, example computing system 310 can be a user computing system or device. In other examples, cloud 101 can consist of one or more example computer systems, similar to computing system 310, coupled or linked via software and hardware components to operate collectively as a cloud.

In broad overview, the computing system 310 includes at least one processor 350 for performing actions in accordance with instructions and one or more memory devices 370 or 375 for storing instructions and data. The illustrated example computing system 310 includes one or more processors 350 in communication, via a bus 315, with at least one network interface driver controller 320 with one or more network interface cards 322 connecting to one or more network devices 324, memory 370, and any other devices 380, e.g., an I/O interface. The network interface card 322 may have one or more network interface driver ports to communicate with the connected devices or components. Generally, a processor 350 executes instructions received from memory. The processor 350 illustrated incorporates, or is directly connected to, cache memory 375.

In more detail, the processor 350 may be any logic circuitry that processes instructions, e.g., instructions fetched from the memory 370 or cache 375. In many embodiments, the processor 350 is a microprocessor unit or special purpose processor. The computing device 310 may be based on any processor, or set of processors, capable of operating as described herein. The processor 350 may be a single core or multi-core processor. The processor 350 may be multiple processors. In some implementations, the processor 350 can be configured to run multi-threaded operations. In some implementations, the processor 350 may host one or more virtual machines or containers, along with a hypervisor or container manager for managing the operation of the virtual machines or containers. In such implementations, the methods shown and described in FIGS. 4-6 can be implemented within the virtualized or containerized environments provided on the processor 350.

The memory 370 may be any device suitable for storing computer readable data. The memory 370 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 310 may have any number of memory devices 370. In some implementations, the memory 370 supports virtualized or containerized memory accessible by virtual machine or container execution environments provided by the computing system 310.

The cache memory 375 is generally a form of computer memory placed in close proximity to the processor 350 for fast read times. In some implementations, the cache memory 375 is part of, or on the same chip as, the processor 350. In some implementations, there are multiple levels of cache 375, e.g., L2 and L3 cache layers.

The network interface driver controller 320 manages data exchanges via the network interface driver 322 (also referred to as network interface driver ports). The network interface driver controller 320 handles the physical and data link layers of the OSI model for network communication. In some implementations, some of the network interface driver controller's tasks are handled by the processor 350. In some implementations, the network interface driver controller 320 is part of the processor 350. In some implementations, a computing system 310 has multiple network interface driver controllers 320. The network interface driver ports configured in the network interface card 322 are connection points for physical network links. In some implementations, the network interface controller 320 supports wireless network connections and an interface port associated with the network interface card 322 is a wireless receiver/transmitter. Generally, a computing device 310 exchanges data with other network devices 324 via physical or wireless links that interface with network interface driver ports configured in the network interface card 322. In some implementations, the network interface controller 320 implements a network protocol such as Ethernet.

The other network devices 324 are connected to the computing device 310 via a network interface driver port included in the network interface card 322. The other network devices 324 may be peer computing devices, network devices, or any other computing device with network functionality. For example, a first network device 324 may be a network device such as a hub, a bridge, a switch, or a router, connecting the computing device 310 to a data network such as the Internet or Cloud 101 shown in FIG. 1.

The other devices 380 may include an I/O interface, external serial device ports, and any additional co-processors. For example, a computing system 310 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 300 includes an additional device 380 such as a coprocessor, e.g., a math co-processor can assist the processor 350 with high precision or complex calculations.

Instructions on computing system 310 may control various components and functions of computing system 310. For example, the instructions may be executed to perform any of the methods indicated in this disclosure. In some examples, algorithms can be included as a subset of or otherwise as part of instructions included on computing system 310. Instructions can include algorithms to execute any of the methods or a subset of the methods described within this disclosure.

User interfaces on the computing system 310 may include a screen which allows a user to interact with computing system 310, such as a touch screen or buttons. A display can also be included such as an LCD, LED, mobile phone display, electronic ink, or other display to display information about computing system 310. The user interface can allow for both input from a user and output to a user. A communication interface(s) can include hardware and software to enable communication of data over standards such as Wi-Fi, Bluetooth, infrared, radio-wave, and/or other analog and digital communication standards. Communication interface(s) allow for computing system 310 to be updated and information generated by computing system 310 to be shared to other devices. In some examples, communication interface(s) can send information stored in memory to another user device for display, storage or further analysis.

As explained below, the following methods can be used to determine a "root cause" change within a configuration related to events or errors within a network. In some examples, the methods and algorithms described herein can be performed on systems described in reference to FIGS. 1-3, such as for example, computer system 310 or analysis module 150.

As described herein, analysis of a "root cause" based on an error or other trigger can be performed. Examples of triggers can include, for example, anomalies in the network such as a change in network traffic, throughput, high loss, latency, a drop in packets, or changes in packet flows, or dropped connections.

Figure 4:
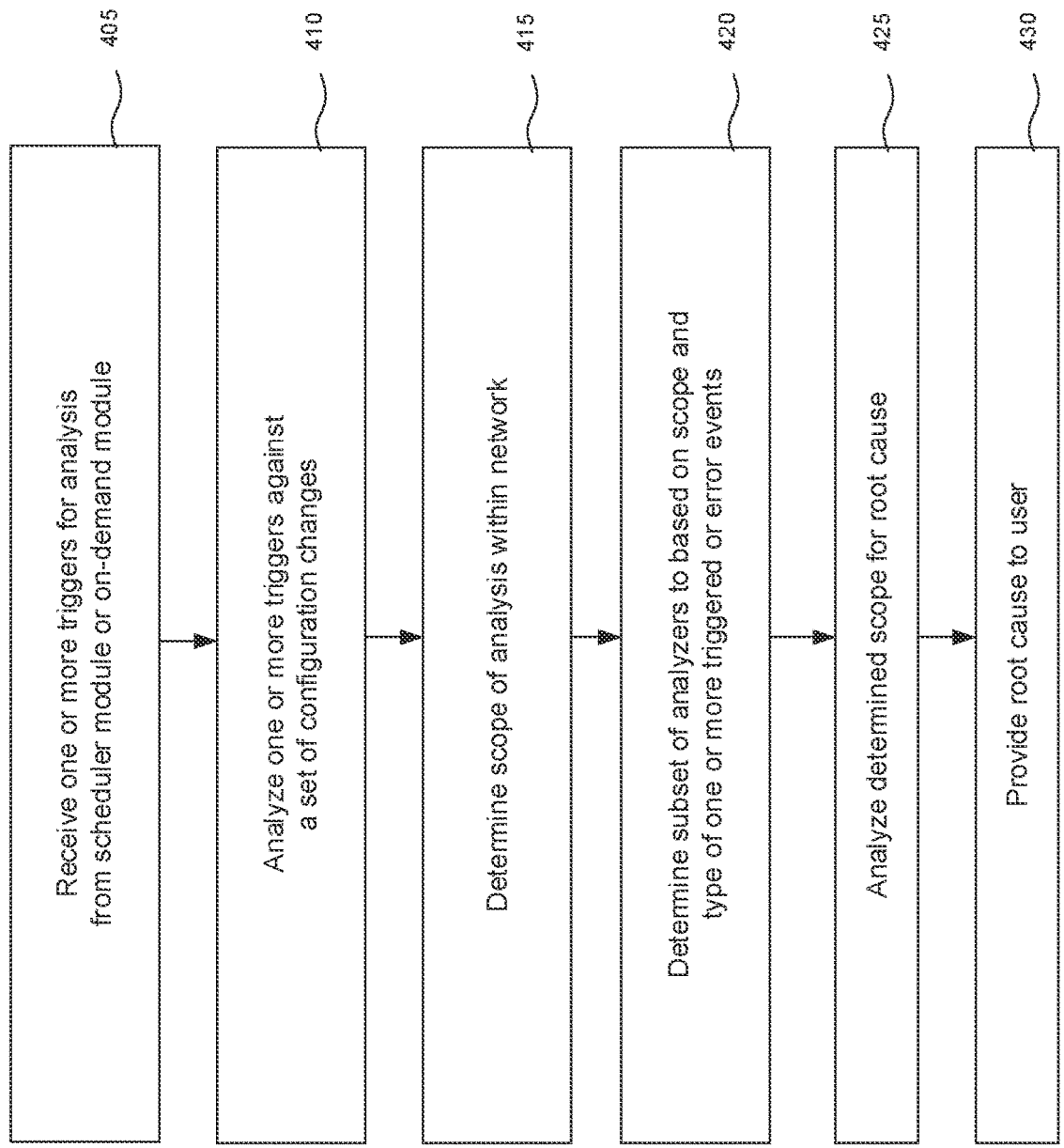
FIG. 4 illustrates aspects related to an example method for auto-correlated network failure determination.

FIG. 4 illustrates a flow chart of an example method 400 to perform root cause analysis.

At block 405, one or more triggers to initiate analysis may be received, for example, from a scheduler module or on-demand module. Examples of triggers can include errors or other events, such as broken connections, dropped packets, high latency, or inaccessibility of certain network resources. In some examples, a list of triggers can be maintained. In other examples, an event can be determined to be a trigger based on user feedback. In such examples, machine learning techniques can be used on a set of user feedback and triggers to generate or determine a set of events which can be triggers.

In some examples, triggers can be determined or derived from parameters, such as network parameters. Examples of such network parameters include IP address, Subnet Mask, default Gateway, DNS Server and Host Name, node status, public or private cloud, throughput, response time, waiting time, network topology, average traffic data, time series analysis of network. Other examples can include: round trip time (RTT) which is, roughly speaking, the time it takes for a network packet to get from a source to a destination and an acknowledgement of delivery to the destination at the source; packet retransmits, which are events where a packet is resent by the sender due to either a request by the receiver to resend it or due to timeout in which no acknowledgement was received by the source of packet; packet size distribution; number of new connections; and rate of increase or decrease in the number of connections.

In some examples, the trigger can be derived or generated automatically based on a deviation from a normal or historical set of data related to the above parameters. The deviation and "norm" can be determined by using, for example, statistical or machine learning techniques.

At block 410, the one or more triggers can be compared or analyzed against a set of configuration changes. For example, the set of configuration changes can be determined from periodically stored configuration data for the network. In some examples, the configuration data can be stored in a log whenever a change within the cloud or network, or a portion thereof, is made. In some examples, the configuration data can be stored periodically, and the "delta" or change between the configuration data of two periods can be determined. In other examples, the configuration data can be stored at checkpoints, such as when the configuration data is changed above a predetermined threshold. According to some examples, only a subset of the configuration changes which could potentially cause the type of error are selected from the set of configuration changes based on the one or more triggers based on, for example, a set of expert rules.

At block 415, a scope of the network or cloud to be analyzed can be determined. Determination of the scope can include determination of particular virtual machines, projects, subnets, physical devices running one or more components of the cloud, a set of resources, whether directly impacted or otherwise related to the trigger, or any other logical partition. According to some examples, the scope of network may be selected based on the subset of configuration changes generated in block 410.

At block 420, a subset of analyzers to be used from an analyzers module, such as module 160, is selected. In some examples, the set can be selected based on a type of trigger and/or the scope determined in block 415. In some examples, the selection of the analyzers can be based on expert rules.

At block 425, a root cause is determined. In some examples, the root cause for the errors can be determined based on one subset of analyzers selected in block 420. In some examples, multiple analyzers can determine multiple potential causes, and the causes can be correlated by a correlator to determine the root cause. In some examples, multiple potential root causes can be established, which can be ranked or hierarchically arranged, such that the most probable or significant root causes is ranked highest and considered to be the determinative root cause.

In some examples, the root cause can be linked to a specific configuration file or multiple changes within a configuration for the network or configuration files.

At block 430, the root cause can be provided to the user. In some examples, the root cause can be displayed in a visual format to a user, output in an audible format, sent via a message or other transmission, or otherwise provided to the user. In some examples, the root cause or causes can be ranked or ordered, such that when presented to a user, such that the user receives the most impactful or significant root causes responsive to the analysis performed in the above-described blocks.

In some examples, the blocks described above can be performed in a different order, simultaneously, or use the results from one block for performing another block.

In some examples, notifications generated by the methods described herein can also be stored into a log, accessible by a user or a cloud administrator. The log itself can be analyzed or used to modify the thresholds or machine learning techniques described above.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A method of evaluating a root cause of a cloud network failure, the method comprising:
   receiving, at a computing system interface, one or more triggers for analysis, the one or more triggers corresponding to a failure within the cloud network;
   providing access to configuration data in response to receiving the one or more triggers, the configuration data being indicative of configuration of the cloud network and being subject to update, and determining a set of configuration changes based on the configuration data;
   comparing, using one or more processors, the one or more triggers against the set of configuration changes to generate a subset of configuration changes that could have caused the failure;
   determining, using the one or more processors, a scope of analysis within the cloud network based on the subset of configuration changes and the one or more triggers, the scope of analysis corresponding to a portion of the cloud network to be analyzed and including a set of network resources which are related to a set of network resources directly affected by the failure, wherein knowledge based dependency graphs are used to find the set of network resources which are related;
   selecting, using the one or more processors, a set of analyzers from an analyzer module based on at least the scope of the analysis, the set of analyzers being associated with respective ones of the knowledge based dependency graphs, and the knowledge based dependency graphs evolving over time based on events of a scheduler queue and through the evolving over time of expert rules on which the knowledge based dependency graphs are built, the expert rules evolving over time according to user feedback with the extent of the evolving determined by machine learning;
   performing, using the one or more processors, an analysis of the determined scope of the cloud network by using the selected set of analyzers to analyze the failure, wherein the selected set of analyzers determine potential causes of the failure;
   determining, using the one or more processors, the root cause of the failure based on correlating the potential causes;
   providing, via a user interface, an indication of the root cause to a user;
   wherein a scheduler module is to receive the one or more triggers for analysis; and
   wherein the scheduler queue contains a list of triggers or events, and wherein the list of triggers or events are used in scheduling analysis of the cloud network.

2. The method of claim 1 wherein the scope of analysis is determined using a software module trained using a machine learning model.

3. The method of claim 2 wherein the machine learning model is trained using a set of expert rules.

4. The method of claim 1 wherein the scope of analysis is determined based on a software module trained using expert rules.

5. The method of claim 1 wherein the selection of the set of analyzers is based on a trained machine learning model.

6. The method of claim 1 wherein a scheduler initiates the evaluation of the root cause at predetermined intervals.

7. The method of claim 1 wherein a correlator builds the knowledge based dependency graphs.

8. A system comprising one or more processors coupled to a non-transitory memory, the non-transitory memory comprising instructions which when executed by the processors perform the steps of:
receiving, at an interface of the system, one or more triggers for analysis, the one or more triggers corresponding to a failure within the cloud network;
providing access to configuration data in response to receiving the one or more triggers, the configuration data being indicative of configuration of the cloud network and being subject to update, and determining a set of configuration changes based on the configuration data;
comparing, using the one or more processors, the one or more triggers against the set of configuration changes to generate a subset of configuration changes that could have caused the failure;
determining, using the one or more processors, the scope of analysis within the cloud network based on the subset of configuration changes and the one or more triggers, the scope of analysis corresponding to a portion of the cloud network to be analyzed and including a set of network resources which are related to a set of network resources directly affected by the failure, wherein knowledge based dependency graphs are used to find related resources;
selecting, using the one or more processors, a set of analyzers from an analyzer module based on at least the scope of the analysis, the set of analyzers being associated with respective ones of the knowledge based dependency graphs, and the knowledge based dependency graphs evolving over time based on events of a scheduler queue and through the evolving over time of expert rules on which the knowledge based dependency graphs are built, the expert rules evolving over time according to user feedback with the extent of the evolving determined by machine learning;
performing, using the one or more processors, an analysis of the determined scope of the cloud network by using the selected set of analyzers to analyze the failure, wherein the selected set of analyzers determine potential causes of the failure;
determining, using the one or more processors, the root cause of the failure based on correlating the potential causes;
providing, via a user interface, an indication of the root cause to a user;
wherein a scheduler module is to receive the one or more triggers for analysis; and
wherein the scheduler queue contains a list of triggers or events, and wherein the list of triggers or events are used in scheduling analysis of the cloud network.

9. The system of claim 8 wherein analyzers within the analyzer module have a plurality of hierarchies.

10. The system of claim 9 wherein the plurality of hierarchies correspond to logical levels within the cloud network.

11. The system of claim 8 further comprising a model module, the model module comprising a plurality of models, wherein each model of the plurality of models is to select a scope of the cloud network or resources within the cloud network for analysis.

12. The system of claim 10 wherein one or more models are selected based on the one or more triggers.

13. A non-transient computer readable medium containing program instructions, the instructions when executed perform the steps of:
receiving, at a computing system interface, one or more triggers for analysis, the one or more triggers corresponding to a failure within the cloud network;
providing access to configuration data in response to receiving the one or more triggers, the configuration data being indicative of configuration of the cloud network and being subject to update, and determining a set of configuration changes based on the configuration data;
comparing, using one or more processors, the one or more triggers against the set of configuration changes to generate a subset of configuration changes that could have caused the failure;
determining, using the one or more processors, the scope of analysis within the cloud network based on the subset of configuration changes and the one or more triggers, the scope of analysis corresponding to a portion of the cloud network to be analyzed and including a set of network resources which are related to a set of network resources directly affected by the failure, wherein knowledge based dependency graphs are used to find related resources;
selecting, using the one or more processors, a set of analyzers from an analyzer module based on at least the scope of the analysis, the set of analyzers being associated with respective ones of the knowledge based dependency graphs, and the knowledge based dependency graphs evolving over time based on events of a scheduler queue and through the evolving over time of expert rules on which the knowledge based dependency graphs are built, the expert rules evolving over time according to user feedback with the extent of the evolving determined by machine learning;
performing, using the one or more processors, an analysis of the determined scope of the cloud network by using the selected set of analyzers to analyze the failure, wherein the selected set of analyzers determine potential causes of the failure;
determining, using the one or more processors, the root cause of the failure based on correlating the potential causes;
providing, via a user interface, an indication of the root cause to a user;
wherein a scheduler module is to receive the one or more triggers for analysis; and
wherein the scheduler queue contains a list of triggers or events, and wherein the list of triggers or events are used in scheduling analysis of the cloud network.

14. The non-transient computer readable medium of claim 13 wherein the scope of analysis is done based on a software module trained using a machine learning model.

15. The non-transient computer readable medium of claim 14 wherein the machine learning model is trained using a set of expert rules.

* * * * *